(12) United States Patent
Lum et al.

(10) Patent No.: US 7,130,138 B2
(45) Date of Patent: Oct. 31, 2006

(54) ENVIRONMENTAL STRESS PROTECTION SCHEME FOR A DATA STORAGE DEVICE

(75) Inventors: CheeWai Lum, Singapore (SG); YeowWeoi Yek, Singapore (SG); LianYong Tan, Singapore (SG)

(73) Assignee: Seagate Technology LLC, Scotts valley, CA (US)

( * ) Notice: Subject to any disclaimer, the term of this patent is extended or adjusted under 35 U.S.C. 154(b) by 232 days.

(21) Appl. No.: 10/736,086

(22) Filed: Dec. 15, 2003

(65) Prior Publication Data

US 2005/0128623 A1    Jun. 16, 2005

(51) Int. Cl.
G11B 27/36   (2006.01)
G11B 5/09    (2006.01)

(52) U.S. Cl. ......................................... 360/31; 360/53
(58) Field of Classification Search .................. None
See application file for complete search history.

(56) References Cited

U.S. PATENT DOCUMENTS

| | | | |
|---|---|---|---|
| 4,967,155 A | | 10/1990 | Magnuson |
| 5,517,613 A | | 5/1996 | Brant |
| 5,588,007 A | * | 12/1996 | Ma ............................. 714/719 |
| 5,857,059 A | * | 1/1999 | Yamagishi ................... 386/125 |
| 5,894,376 A | | 4/1999 | Rinard |
| 6,151,183 A | * | 11/2000 | Ogasawara et al. ........... 360/75 |
| 6,266,202 B1 | | 7/2001 | Nguyen |
| 6,289,484 B1 | * | 9/2001 | Rothberg et al. ........... 714/769 |
| 6,366,980 B1 | | 4/2002 | Haines |
| 6,405,277 B1 | * | 6/2002 | Jen et al. ....................... 711/4 |
| 6,512,644 B1 | | 1/2003 | Hall |
| 6,975,467 B1 | * | 12/2005 | Lewkowicz et al. .......... 360/31 |
| 2002/0036855 A1 | | 3/2002 | Lenny |
| 2003/0002187 A1 | | 1/2003 | Ko |
| 2004/0042105 A1 | * | 3/2004 | Cho ............................. 360/31 |

OTHER PUBLICATIONS

Hughes et al, Improved Disk Drive Failure Warnings, Sep. 2002, IEEE Transactions on Reliability, vol. 51, No. 3, p. 351, Table I.*

* cited by examiner

Primary Examiner—Andrea Wellington
Assistant Examiner—Dan I Davidson
(74) Attorney, Agent, or Firm—Fellers, Snider, et al.

(57) ABSTRACT

A system to ensure written data integrity in a data storage device that is operating outside of predefined normal operating conditions is disclosed. The system includes an environmental stress monitoring module operable to identify data storage device operation in an environmental stress condition and a write integrity check module for verifying written data integrity during data storage device operation in the environmental stress condition. The system and method of data protection provides a means of ensuring written data integrity without sacrificing performance during normal drive operational environmental conditions.

12 Claims, 3 Drawing Sheets

ENVIRONMENTAL STRESS PROTECTION SCHEME FOR A DATA STORAGE DEVICE

FIELD OF THE INVENTION

This application relates generally to data storage devices and more particularly to a system and method for verification of written data automatically in the event a write operation occurs during an out of specification environmental condition.

BACKGROUND OF THE INVENTION

Modern disc drives are designed to operate within a predetermined range of environmental conditions. These conditions are chosen based on a number of factors such as normal expected handling activities, ambient and operational temperatures expected, and atmospheric pressures. These ranges are relatively broad, with the intention of accommodating the most expected conditions of use. Such ranges are also a balance between expectations and design constraints. However, in actual practice, operation of the drives can and does occur outside these ranges, as the manufacturer has no control over the ultimate use by the customer in most cases.

If drive operation occurs outside of the envelope of these expected environmental conditions, the drive is subjected to an "environmental stress". In such conditions, data written to the storage discs may not be accurately recorded or sufficiently recorded to permit accurate and consistent reads. Examples of such stress conditions are operation of the disc drive within a poorly ventilated PC system or surviving a cold boot in a poorly radiated storeroom during the deep of winter. Another example of environmental stress condition is excessive vibration.

Operating mobile hard disc drives must withstand consistent shock and vibration. In these drives, there is internal hardware protection of the drive to minimize the occurrence of drive fatality, i.e. a head slamming onto disc media as a result of the drive coming into extreme physical contact against other object(s) such as might occur if the laptop is hit or dropped during operation. However this hardware protection does not guarantee or verify a valid write operation. It only potentially safeguards the drive from total malfunction.

Accordingly there is a need for a system and method for avoiding incorrect writing of data during environmental stress conditions. The present invention provides a solution to this and other problems, and offers other advantages over the prior art.

SUMMARY OF THE INVENTION

Against this backdrop embodiments of the present invention have been developed. An Environmental Stress Protection Scheme (ESPS) in accordance with an embodiment of the present invention ensures that, under a detected environmental stress operational condition, no data loss will occur when performing write operations to the media by conditionally invoking and applying a Write Integrity Check Algorithm on each write command so long as the stress condition is sensed to exist.

The Write Integrity Check Algorithm (WICA) ensures verifies that a particular sector is written correctly to the media by reading back the write signal from that particular sector direct from the media and verifying its integrity. The read back signal is compared to the intended write signal. Assuming the read signal does not match the intended write signal, that particular sector will be reassigned to another sector. If there are no more spare sectors to be allocated for the reassignment process, the drive will report a write command error to the host system. Following the reassignment sequence, the write/read compare procedure is performed for the just reassigned Logical Block Address (LBA) location. If the data is verified to be valid, then that reassignment process is reported to be successful and the drive will continue its subsequent command servicing. However if the data is verified to be invalid, a write error signal is generated and a write command error is issued to the host system. The WICA is preferably only invoked when a stress condition is identified. Thus, when the drive is operating in a normal environment, the additional processing delays, causing an inherent performance hit, experienced in performing write verification is avoided.

These and various other features as well as advantages which characterize the present invention will be apparent from a reading of the following detailed description and a review of the associated drawings.

DETAILED DESCRIPTION

Figure 1:
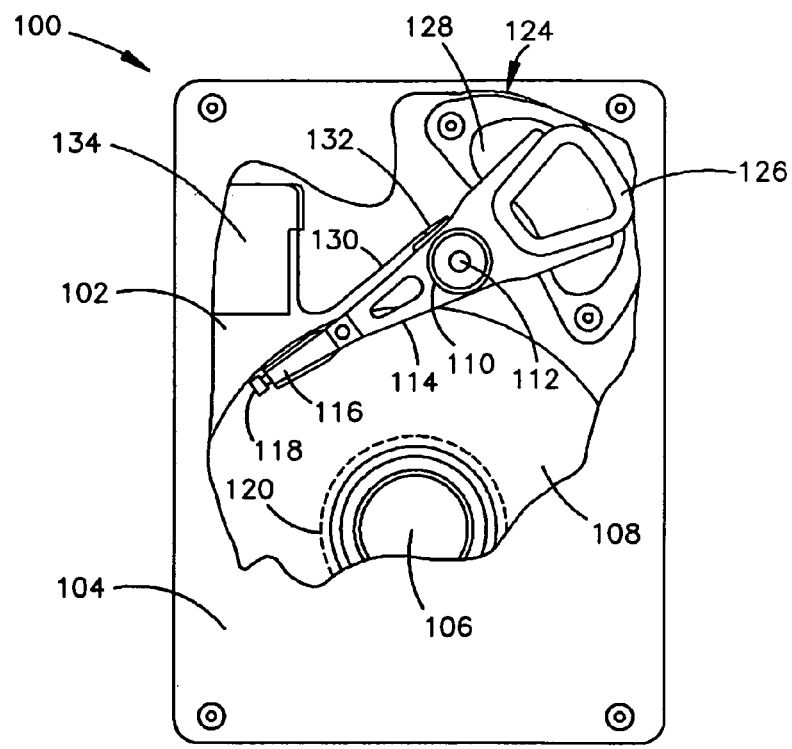
FIG. 1 is a plan view of a disc drive incorporating a preferred embodiment of the present invention showing the primary internal components.

A disc drive 100 incorporating a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes a fluid bearing slider, enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved either off of the discs 108 to a park ramp, or over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
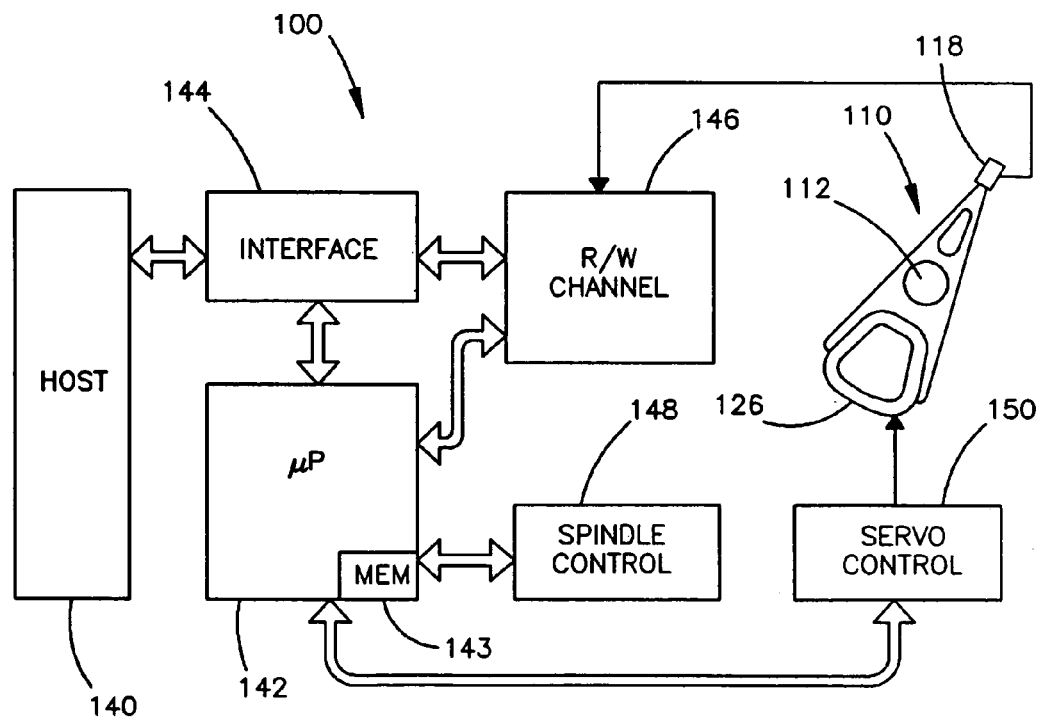
FIG. 2 is a block diagram of the control scheme for the disc drive shown in FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is operable connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high-speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device.

The firmware of the disc drive 100 typically incorporates a self-monitoring, analysis and reporting tool (SMART) algorithm that processes internally measured parameters that may include operating temperature, atmospheric pressure, vibration, track ECC failure statistics, and other parameters and operational statistics. These measured parameters are preserved for potential failure analysis in the event that drive failure occurs. Such records are invaluable tools for determination of failure modes in a failed drive. The drive manufacturer typically performs this failure analysis. As the SMART sensors and algorithm is often built in to some drives, the addition of temperature detectors, pressure detectors, vibration sensors etc, may not be necessary in order to implement an environmental stress protection scheme (ESPS) in accordance with the present invention, although it is to be understood that such monitoring sensors may be required to be added into the drive in addition to the ESPS routines described below in order to fully implement an embodiment of the present invention described below.

For purposes of the following discussion, it is assumed that environmental and operational parameter sensors are provided in the hardware of the disc drive. Such environmental sensors may include monitors that directly monitor the parameter of interest such as temperature, or may sense a parameter that is related to the parameter of interest, such as signal amplitude, current or voltage level that is proportional to the parameter of interest. The signals from these sensors are fed to appropriate comparators that compare the signals to range limits, such as upper and lower temperature limits for normal data storage device operation. The comparator then provides an output signal to the ESPS if the measured parameter falls outside the predetermined range. For example, the recommended operational temperature range for a disc drive may be 0-60 degrees centigrade. A thermal comparator would then provide an output signal, or set a flag bit, if temperature either exceeds 60 degrees centigrade or falls below 0 degrees centigrade.

An ESPS in accordance with an embodiment of the present invention basically includes an environmental stress monitoring module and a write integrity check algorithm module. The stress-monitoring module may simply tap into existing SMART data outputs already provided in the firmware. The WICA module constitutes a software routine that is invoked whenever the monitoring module indicates a stress condition.

Figure 3:
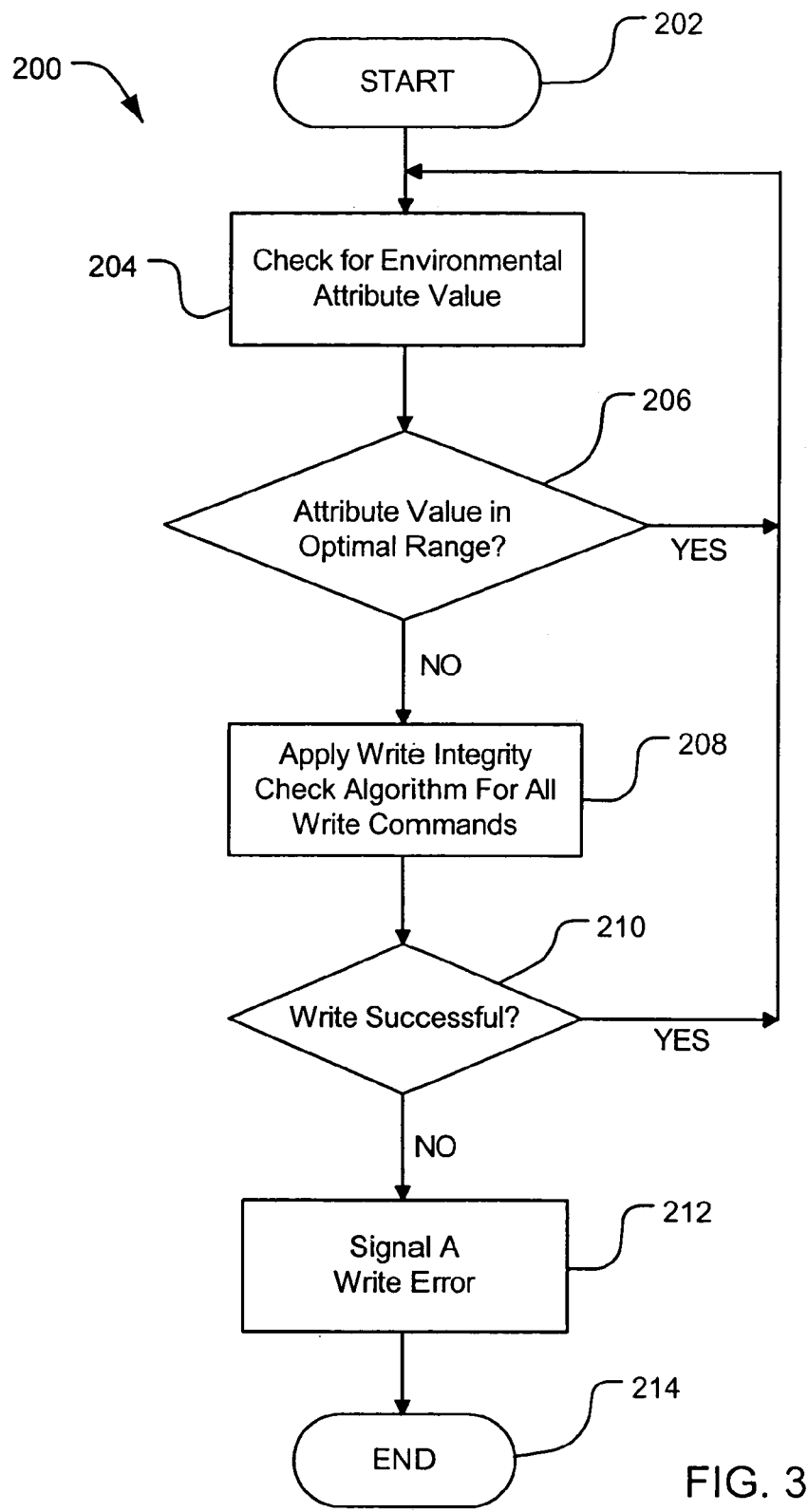
FIG. 3 is a block diagram of the Environmental protection scheme in accordance with an embodiment of the present invention.

An operational flow block diagram of an ESPS 200 in accordance with an embodiment of the present invention is shown in FIG. 3. This ESPS 200 is designed to be operational whenever the disc drive 100 is powered on. The ESPS 200 routine begins in operation 202 where, upon drive initial startup, operations 204 and 206 are continuously sequentially performed. Specifically, from start operation 202, control transfers to operation 204. In operation 204, each of the predetermined operational parameters is checked for their environmental attribute values. These parameters may simply be a subset of the parameters monitored in an existing SMART scheme in the firmware of the drive or may be specifically provided in the ESPS 200. For example, an operational temperature comparator, a pressure comparator, a vibration comparator, may be checked. Other parameters may also be checked that have, either directly or by inference, an environmental component. Control then transfers to query operation 206.

In operation 206, the query is made whether the environmental comparator output attributes are all as expected, e.g., zero, signifying that operation is within expected optimal range. If the output attributes are as expected, control transfers back to operation 204, and the check is performed again. This continual return and recheck of the environmental attribute values continues indefinitely during drive operation until an out of range condition is detected in operation 206. Once such an out of range condition is detected, control transfers to operation 208.

In operation 208, a write integrity check algorithm (WICA) is instituted for each and every write command received from the host so long as there is an out of spec condition identified in operation 206. The WICA is discussed below with reference to FIG. 4.

Control then transfers to operation 210. Here, if the write command received was executed successfully, control transfers back to operation 204 and the above check repeats. If, on the other hand, the write was unsuccessful, control transfers to operation 212 where a write error is signaled to the host computer. Control then returns in end operation 214.

In summary, so long as there is an environmental stress condition present as determined in operations 204 and 206, every write command will be write verified. If any write errors are detected, processing will stop and a write error will be sent to the host.

Figure 4:
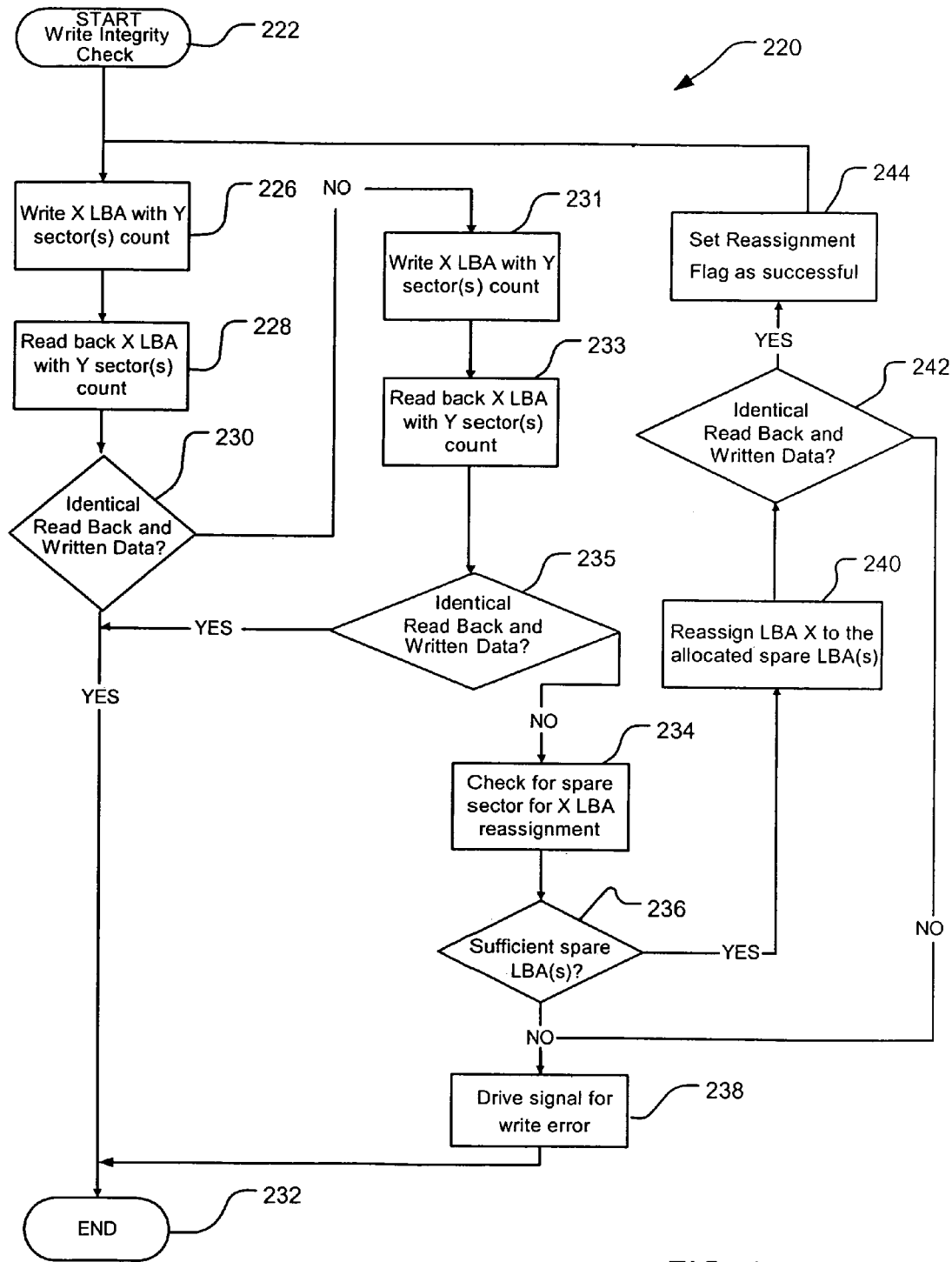
FIG. 4 is a block diagram of the write Integrity Check algorithm in accordance with an embodiment of the present invention.

Referring now to the WICA block diagram 220 shown in FIG. 4, if an environmental stress condition has been identified, the WICA begins in operation 222. First, a write command to write data "X" is received from the host. The data "X" to be written is assigned a logical block address (LBA) and the number of sectors required for storage of the data, Y, is determined. Control then transfers to operation 226.

In operation 226, the data is written to X LBA with Y sector count. Control then transfers to operation 228 where the written data is immediately read back. Control then transfers to query operation 230. Here the written data is compared to the read back data. If the read back data is identical to the written data, control transfers to end operation 232 which transfers overall control back to operation 204 described above, as the write integrity check was successful and the written data has been confirmed. On the other hand, if the read back data is different from the written data, control transfers to operation 231 to write the same data back to the same location. Control will be transferred to operation 233, which is similar to the operation 228. Control then transfers to query operation 235 and thus the written data is compared to the read back data. If successfully read back, control transfers to end operation 232 and subsequently back to operation 204 mentioned as this write integrity check has been successful. On the other hand, if the read back data is different from the written data, control transfers to operation 234 for reallocation of the written data.

In operation 234, a check is made whether there exists a spare sector for reassignment of the written data in operation 226. Control then transfers to query operation 236. If yes, there is sufficient spare LBA(s) then control transfers to operation 240. Operation 240 reassigns LBA X to the allocated spare LBA or LBAs, and writes the data to the spare sectors on the disc. Control then transfers to operation 242 where the data written again, to the spare sectors, is read back and compared with the originally written data. If the read back data for the write command received indicates that the data written was successful, control transfers to operation 244.

In operation 244, a success flag is set and control passes back to operation 210 as a successful write, and overall control passes back to operation 226 for the next write instruction in the write integrity check 220. However, if the query in operation 242 is no, the read back and written data are not identical, control passes to operation 238, where a write error is indicated and the routine ends in operation 232. In this way, the WICA verifies each write command that issues from the host so long as an out of environmental specification condition exists.

This arrangement ensures that, during normal operating conditions, unnecessary performance delays are minimized while still providing a measure of reliability for the user in the event of an adverse environmental condition being experienced by the drive. Finally, an additional feature may also be incorporated into the operation 206. Operation 206 may also include an indication provided to the host to alert the user that an out of specification condition has been sensed and that subsequent operation will be at a reduced performance level until the out of specification condition is corrected.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the write integrity check 220 may simply be directly incorporated into the routine 200 rather than provided as separate routines as described above. The WICA may be performed on a predetermined batch of writes rather than on each individual write, as it occurs, once an out of spec environmental stress condition is sensed. Also, within the WICA, after the reassignment flag is set as successful in operation 244, control could return directly to end operation 232 and thus back to the ESPS operation 204. Numerous other changes may be made which will readily suggest themselves to those skilled in the art and which are encompassed in the spirit of the invention disclosed and as defined in the appended claims.

What is claimed is:

1. A system comprising:
   an environmental stress monitoring module operable to monitor an atmospheric pressure of a data storage device and signal an environmental stress condition if said pressure is outside a predetermined range; and
   a write integrity check module for verifying written data integrity during data storage device operation in said environmental stress condition.

2. The system according to claim 1 wherein the environmental stress condition monitoring module is further configured to signal an environmental stress condition in relation to an error correction code (ECC) rate.

3. The system according to claim 1 wherein the write integrity check module invokes a software routine verifying each write operation following identification of the environmental stress condition by reading back each data written to the data storage device and comparing the read back data with the data written.

4. The system according to claim 1 wherein the environmental stress monitoring module further stores data associated with said stress condition for potential failure analysis in the event that a subsequent failure of the data storage device occurs.

5. A method comprising:
- identifying a non-temperature range environmental stress condition occurring during data storage device operation in relation to track ECC statistics;
- verifying data written to the data storage device after the non-temperature range environmental stress condition is identified; and
- signaling a write error if the data written to the data storage device when verification of the data written is not confirmed.

6. The method according to claim 5 wherein the verifying step comprises:
- writing data to a logical block address;
- reading back the data written to the logical block address; and
- comparing the data read back with the written data.

7. The method according to claim 6 further comprising:
- determining a spare location for the written data if the data read back is not identical to the written data;
- writing the written data to the spare location;
- reading back the data written to the spare location; and
- comparing the data read back from the spare location to the data written to the spare location.

8. The method according to claim 7 further comprising:
- indicating a write error if the data read back from the spare location is not identical to the data written to the spare location.

9. The method according to claim 5 wherein data associated with the indentifying step is further preserved for potential failure analysis in the event that a device failure occurs.

10. An apparatus comprising:
- a data transducer configured to transfer data with a data storage medium;
- an environmental stress monitoring module configured to identify a non-temperature range environmental stress condition; and
- a data integrity check module which verifies data integrity after a data transfer operation of the data transducer in relation to identification of the non-temperture range environmental stress condition by the environmental stress monitoring module, wherein the environmental stress monitoring module further preserves data associated with the non-temperature range condition for potential failure analysis in the event that an apparatus failure occurs.

11. The apparatus according to claim 10 wherein the non-temperture range environmental stress condition comprises a selected one of an atmospheric pressure, a vibration levels or an error correction code (ECC) rate.

12. The apparatus according to claim 10 wherein the non-temperature range environmental stress condition comprises an amplitude of a data readback signal transduced by the data transducer.

* * * * *